US006360269B1

(12) United States Patent
Mamros et al.

(10) Patent No.: US 6,360,269 B1
(45) Date of Patent: *Mar. 19, 2002

(54) PROTECTED KEEPALIVE MESSAGE THROUGH THE INTERNET

(75) Inventors: Shawn Mamros, Arlington; Kerry M. Hannigan, Boston, both of MA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,056

(22) Filed: Nov. 2, 1998

(51) Int. Cl.$^7$ .......................... G06F 15/16; G06F 15/173

(52) U.S. Cl. ....................... 709/228; 709/225; 709/229; 709/250

(58) Field of Search ................................. 709/228, 229, 709/250, 225, 203, 217, 219

(56) References Cited

U.S. PATENT DOCUMENTS

| | | | |
|---|---|---|---|
| 5,351,290 A | * 9/1994 | Naeini et al. ................ | 379/145 |
| 5,553,239 A | * 9/1996 | Heath et al. ............ | 395/187.01 |
| 5,633,933 A | 5/1997 | Aziz | |
| 5,822,434 A | 10/1998 | Caronni et al. | |
| 5,996,001 A | * 11/1999 | Quarles et al. ............. | 709/203 |
| 6,115,040 A | * 9/2000 | Bladow et al. ............. | 345/335 |
| 6,147,987 A | * 11/2000 | Chau et al. ................. | 370/352 |

FOREIGN PATENT DOCUMENTS

| WO | WO 97 26735 | 7/1997 |
|---|---|---|

OTHER PUBLICATIONS

Patel BV and Jeronimo M: "Revised SA Negotiation Mode for ISAKMP/Oakley", Internet Draft, Nov., 1977.

Kent S and Atkinson R: "Security Architecture for the Internet Protocol", Internet Draft, Jul. 1998.

Harkins D and Carrel D: "The Internet Key Exchange (IKE)", Internet Draft, Jun. 1988.

Orman HK: "The Oakley Key Determination Protocol", Internet Draft, Aug. 1998.

(List continued on next page.)

Primary Examiner—Zarni Maung
(74) Attorney, Agent, or Firm—Blakely Sokoloff Taylor & Zafman, LLP

(57) ABSTRACT

A method and apparatus for determining the reachability of a remote computer from a local computer through a secured communications link through the Internet. In one embodiment, the secured ISAKMP/Oakley communications link is established between a remote computer and a local computer through the Internet. A protected keepalive message is transmitted by the local computer to the remote computer in the event that the communications link has been idle for a period of time. The protected keepalive message is not a re-key request by the local computer to renegotiate the policy/key(s) of the secured communications link to the Internet. In one embodiment, the protected keepalive message is a protected ISAKMP/Oakley command to which a protected acknowledgement must be supplied. If a protected acknowledgement is received from the remote box by the local box in response to the protected keepalive message, then it is assumed that the remote box is still reachable. However, if the protected acknowledgement is not received from the remote box in response to the protected keepalive message, then it is assumed that their remote box is no longer reachable. In this case, the secured communications link between the remote box and the local box is terminated by the local box.

36 Claims, 4 Drawing Sheets

OTHER PUBLICATIONS

Maughan D., et al. "Internet Security Association and Key Management Protocol (ISAKMP)", Internet Draft, Jul. 3, 1998.

"TCP/IP and IPX Routing Tutorial", at http://www.sangoma.com/fguide.htm, Sangoma Technologies, Inc. 1998.

"Cisco Enterprise Security Solutions Standards", at http://cio.cisco.co.jp/warp/putlic/779/largeent/security/standard.html, Cisco Systems, Inc. 1997.

"ISAKMP and Oakley" at http://www.cisco.com/putlic/library/isakmp/isakmp.html, Cisco Systems, Inc., May 1997.

* cited by examiner

PROTECTED KEEPALIVE MESSAGE THROUGH THE INTERNET

BACKGROUND OF THE INVENTION

1. Field of the Invention

The present invention relates generally to the field of data communications and, more specifically, the present invention relates to data communications through the Internet.

2. Background Information

The traditional workplace is generally thought of as a single location to which all employees commuted and worked during the day. With the explosion of technology, the definition of the workplace is expanding to include telecommuters as well as employees that work while traveling. In addition, employees may often need the ability to login remotely from their home or laptop computer systems to their employer's corporate networks for any number of reasons including accessing or transferring files or simply checking their electronic mail.

FIG. 1 shows a computer system 101 remotely connected to a local area network (LAN) 131. As shown in FIG. 1, computer system 101 is coupled to LAN 131 through a modem 103. Modem 103 is connected to modem 105 through a connection 127. Modem 105 is connected to a LAN bus 107, to which a plurality of other network resources are attached. For example, FIG. 1 shows that computer systems 1 13 and 117 are coupled to LAN bus 107 through network interfaces 111 and 115, respectively.

A disadvantage with the setup described above for remotely coupling computer system 101 to corporate LAN 131 through the modems 103 and 105 is that connection 127 is typically a telephone connection through a public switched telephone network. Thus, if computer system 101 is located a great physical distance away from LAN 131, connection 127 may be a long distance telephone call, which could be quite expensive if used often or for long periods of time.

FIG. 1 also shows that in the alternative, computer system 101 may be coupled to LAN 131 through the Internet 119. As shown in FIG. 1, computer system 101 connects to an Internet service provider (ISP) 121 through connection 133. Typically, connection 133 is a local telephone call, which is more cost-effective in comparison with connection 127 in the event that connection 127 is a long distance telephone call. FIG. 1 shows that ISP 121 is connected to a gateway system 109 through a connection 129 through the Internet 119. Gateway system 109 is connected to LAN 131 through LAN bus 107.

There are a variety of different protocols that may be used for connection 129 between ISP 121 and gateway system 109. One such example protocol is the Point-to-Point Tunnel Protocol (PPTP). A shortcoming of this protocol is that it does not provide complete security in connection 129. As is known to those skilled in the art, the control channel of a PPTP connection is not encrypted. Consequently, it would be relatively easy for an intruder 125 to intercept the non-protected communications in connection 129 between ISP 121 and gateway system 109 and conceivably eavesdrop on communications, disrupt communications, or possibly even masquerade as one of the two parties.

One known protocol providing secured communications through the Internet 119 is the Internet Security Association and Key Management Protocol (ISAKMP)/Oakley protocol combined with Internet Protocol Security (IPSec). ISAKMP/Oakley is used for key management and IPSec is used for transferring encrypted data. As is known to those skilled in the art, the ISAKMP/Oakley protocol was designed to be used primarily for providing secured static host to host communications through the Internet 119 between networks that are not shut down often. For example, a pair of networks such as LAN 131 could communicate securely through the Internet 119 using the ISAKMP/Oakley protocol with IPSec. When designing the ISAKMP/Oakley protocol, it was assumed that the secured host to host (e.g. firewall to firewall) communications through the Internet 119 between networks would be relatively static. That is, the connections between the networks would remain active for relatively long periods of time and therefore would not be dropped frequently.

One disadvantage of using the ISAKMP/Oakley protocol with IPSec in the example illustrated in FIG. 1 is that computer system 101 accesses the Internet 119 through modem 103. As is known to those skilled in the art, it is known that modem connections to the Internet 119 may drop often. For example, if connection 133 is on a noisy telephone line or if for example connection 133 includes the call waiting service, connection 133 could be dropped unexpectedly. As is known to those skilled in the art, the ISAKMP/Oakley protocol does not provide a keepalive feature. Consequently, LAN 131 would not be aware that computer system 101 was no longer reachable until the connection between computer system 101 and LAN 131 times out. Generally, ISAKMP/Oakley connections time out after attempts to renegotiate the policy and keys used to secure the communications link have failed. It is appreciated that the attempts to renegotiate the policy and keys to secure communications under the ISAKMP/Oakley protocol are computationally intensive operations and are therefore not performed at a high enough frequency to detect quickly and reliably that computer system 101 is no longer reachable through Internet 119.

SUMMARY OF THE INVENTION

A method of verifying the reachability of a remote box from a local box is disclosed. In one embodiment, the method includes the steps of establishing a protected Internet communications link between the local box and the remote box. A protected keepalive message is transmitted to the remote box from the local box. The protected Internet communications link is terminated if the remote box fails to transmit to the local box a protected acknowledgement message in response to the protected keepalive message. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Methods and apparatuses for verifying the reachability of a remote computer from a local computer are disclosed. The subject of invention will be described with reference to numerous details set forth below, and the accompanying drawings will illustrate invention. The following description and drawings are illustrative of the invention and are not to be construed as limiting the invention. Numerous specific details are described to provide a thorough understanding of invention. However, in certain instances, well-known or conventional details are not described in order not to unnecessarily obscure the present invention.

Figure 1:
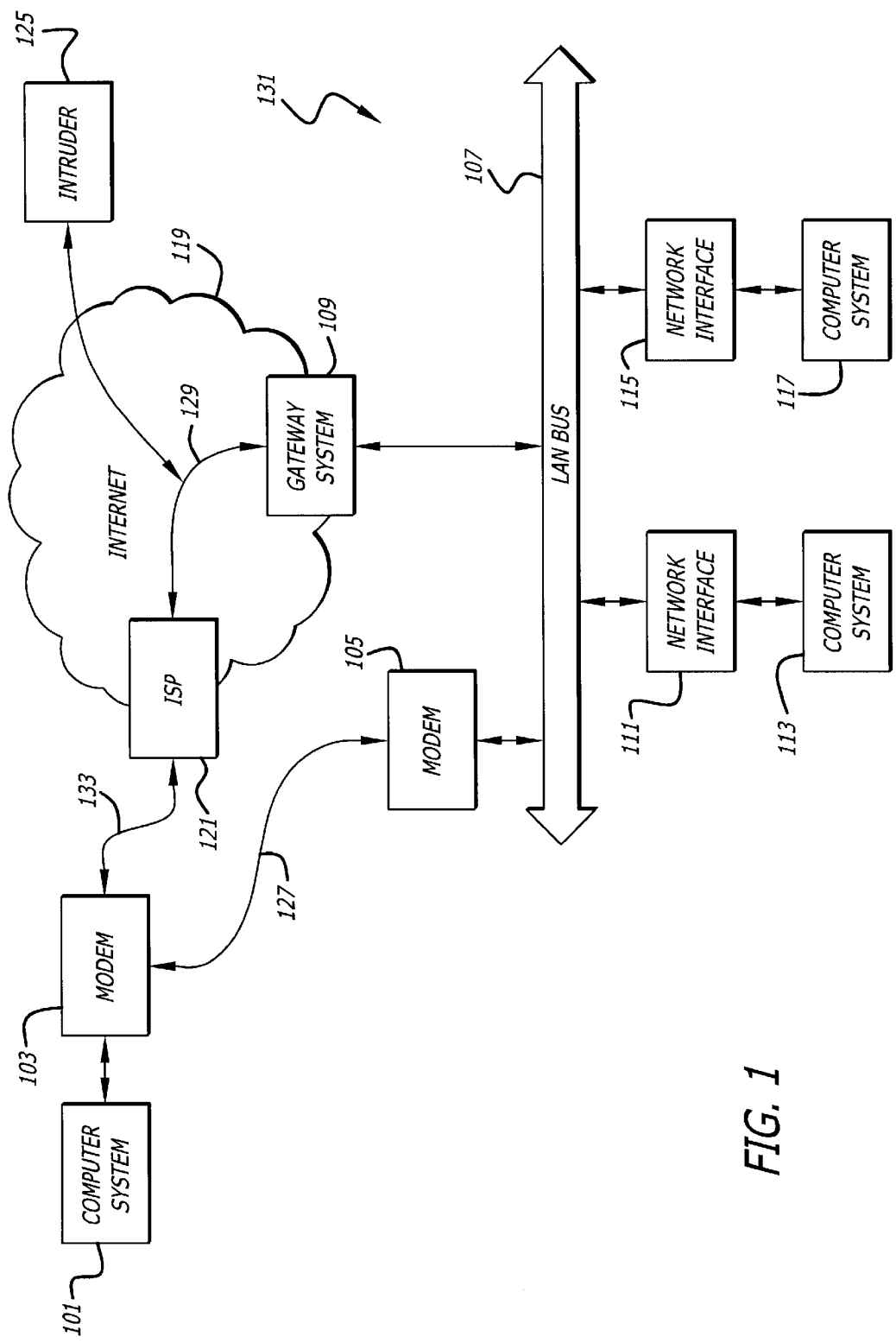
FIG. 1 is an illustration of a remote computer system accessing a LAN through a modem.
Figure 2:
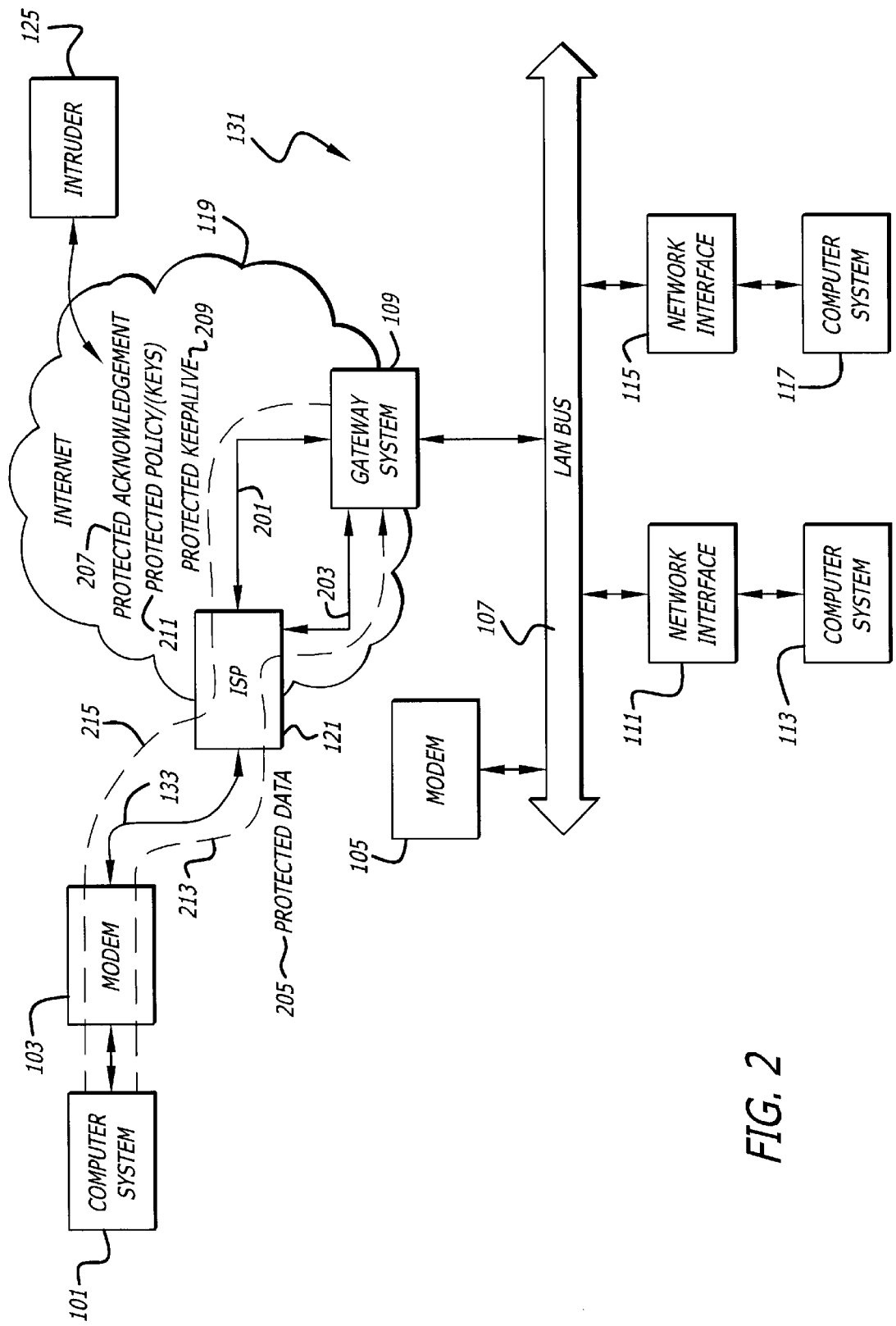
FIG. 2 is an illustration of a remote computer system accessing a LAN through the Internet using a modem with secured communications in accordance with teachings of one embodiment of the present invention.

FIG. 2 shows a computer system 101 coupled to a LAN 131 through the Internet 119 in accordance with the teachings of one embodiment of the present invention. In particular, FIG. 2 shows a computer system 101 coupled to the Internet 119 through ISP 121 through connection 133 from modem 103. In one embodiment, a protected Internet communications link is established between ISP 121 and gateway system 109. In the embodiment depicted in FIG. 2, the protected Internet communications link between ISP 121 and gateway system 109 includes the first and second channels 201 and 203, respectively. LAN 131 accesses the Internet 119 through gateway system 109. In one embodiment, gateway system 109 is coupled to LAN bus 107, to which other LAN 131 resources are connected including modem 105 and computer systems 1 13 and 1 17 through network interfaces 111 and 115, respectively.

It will be appreciated herein that the term "Internet" refers to a network of networks that use a variety of protocols, such as for example the Transmission Control Protocol/Internet Protocol (TCP/IP) protocol, and other protocols including the HTTP for Hypertext Markup Language (HTML) documents. The physical connections of the Internet 119 and other protocols and communication procedures of the Internet 119 are well known to those skilled in the art. Access to Internet 119 is typically provided by Internet service providers (ISPs) such as ISP 121 and gateway systems, such as gateway system 109. Users on client systems, such as for example computer system 101, computer system 113 and computer system 117, obtain access to the Internet 119 through ISPs such as ISP 121 or gateway systems such as gateway system 109. Access to the Internet 1 19 allows users of client computer systems to exchange information, receive and send electronic mail, view electronic documents, etc.

It is noted that while the embodiment illustrated in FIG. 2 depicts that computer system 101 is coupled to the Internet 119 through a "modem" 103, it is appreciated that the interface of computer system 101 to Internet through modem 103 may be an analog modem, an Integrated Services Digital Network (ISDN) modem, cable modem, satellite transmission interface, Digital Subscriber Line (DSL) modem, or other interfaces for coupling a computer system or box to other computer systems or boxes.

Computer systems 113 and 117 are shown in the embodiment illustrated in FIG. 2 to be coupled to LAN bus 107 through network interfaces 111 and 115, which may be an Ethernet network interfaces or other known network interfaces. In one embodiment, LAN bus 107 is coupled to gateway system 109, which may provide firewall and other Internet related services for LAN 131. In one embodiment, gateway system 109 may be a conventional server computer system, or another type of box including for example an Extranet switch that provides Internet 119 access for LAN 131.

Figure 3:
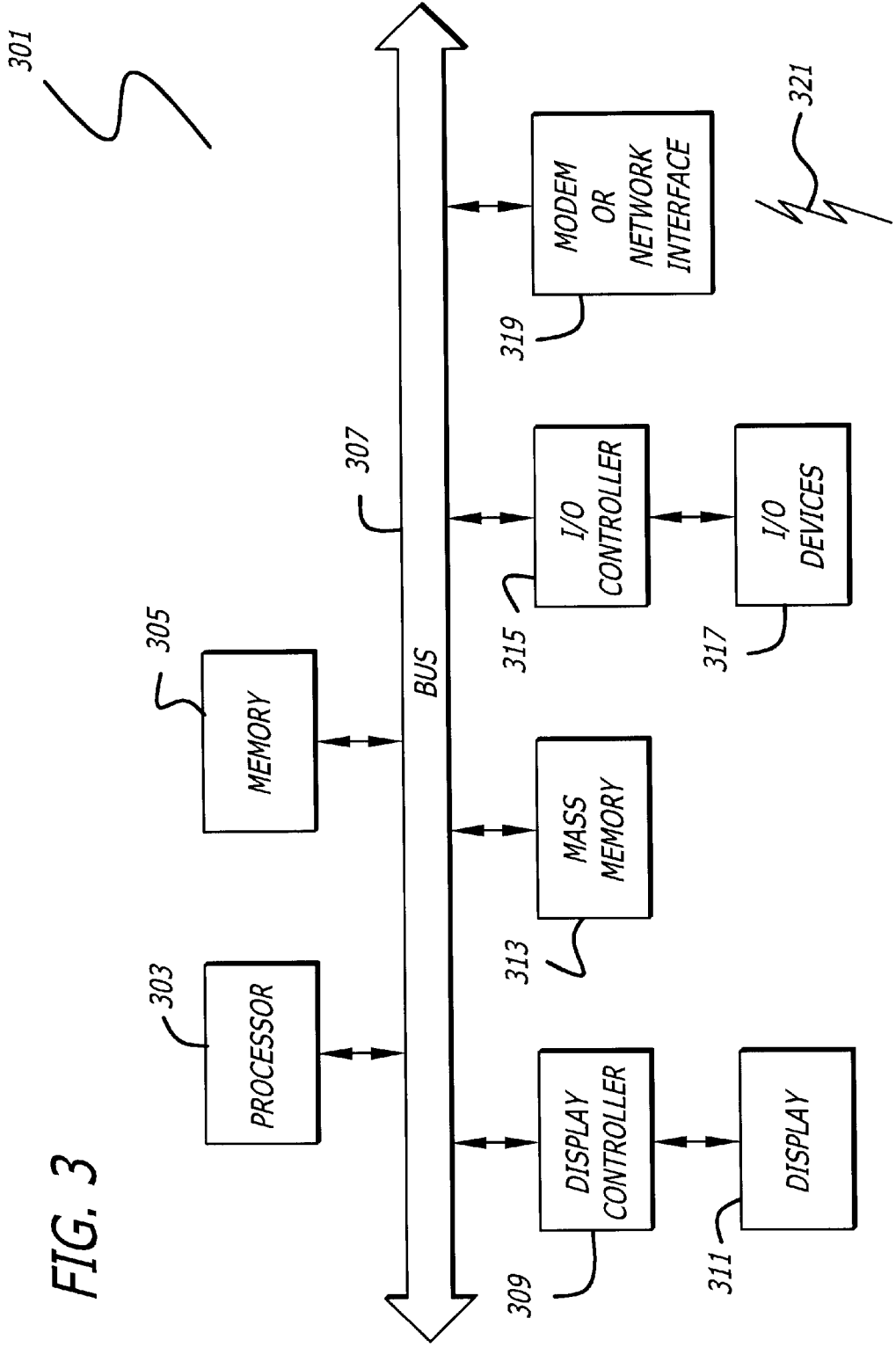
FIG. 3 is an illustration showing an example of a computer system that may be used in accordance with teachings of one embodiment of the present invention.

FIG. 3 shows one embodiment of a conventional computer system 301 that may be included in computer systems 101, 113 and 117 or gateway system 109 of FIG. 2. It will also be appreciated that a computer system 301 may be used to perform many of the functions of Internet service provider, such as for example ISP 121 or the functions of remote and local boxes in accordance with the teachings of the present invention. The computer system 301 interfaces to external systems or boxes through the modem or network interface 319.

Although modems and network interfaces have been separately illustrated in FIG. 2, such as for example modems 103 and 105 and network interfaces 111 and 115, it will be appreciated that the modem or network interface 319 may be considered in some instances to be part of computer system 301. This modem or network interface 319 may be an analog modem, ISDN modem, cable modem, DSL modem, token ring interface, Ethernet interface, satellite transmission interface, or other interfaces for coupling a computer system or box to other computer systems or boxes. As also shown in FIG. 3, a carrier wave signal 321 is received/transmitted by modem or network interface 321 for communications with computer system 301.

In the embodiment illustrated in FIG. 3, computer system 301 includes a processor 303, which may be a conventional microprocessor such as for example an Intel x86 or Pentium family microprocessor, a Motorola 68K or PowerPC family microprocessor, or the like. Memory 305 is coupled to processor 303 by a bus 307. Memory 305 may be dynamic random access memory (DRAM) and may include static random access memory (SRAM). Bus 307 couples processor 303 to memory 305 and also to mass memory 313 and to display controller 309 and the I/O (input/output) controller 315.

Mass memory 313 is often a magnetic hard disk, an optical disk, or another form of storage for large amounts of data. Some of this data is may be written by a direct memory access process into memory 305 during execution of software and computer system 301. It is appreciated that software may also be transmitted or received via modem or network interface 319. For purposes of this specification, the term "computer readable medium" shall be taken to include any medium that is capable of storing or encoding a sequence of instructions for execution by a processor and causes the processor to perform the methodologies of the present invention. The term "computer readable medium" shall be taken to include, but not be limited to solid-state memories, optical and magnetic disks, carrier wave signals, or the like.

It will be appreciated that computer system 301 is merely one example of many possible computer systems that have different architectures. For example, WINTEL systems, systems that include Intel microprocessors running the Microsoft Windows operating system, often have multiple buses, one of which may be considered a peripheral bus. Networked computers may also be considered to be a computer system that may be used with the present invention. Network computers may not include a hard disk or other mass memory 313, and the executable programs are loaded from a network connection into memory 305 for execution by processor 303. A typical computer system will usually include at least processor 303, memory 305 and a bus 307 for coupling memory 305 to processor 303.

It will also be appreciated that computer system 301 is controlled by operating system software that includes a file management system, such as a disk operating system, which is part of the operating system software. One example of an operating system software with its associated file management system software is the operating system known as Windows from Microsoft Corporation of Redmond Washington, and its associated file management system, including Windows Explorer. The file management system is typically stored in the mass memory 313 and causes processor 303 to execute the various steps required by the operating system to input and output data and to access data in memory, including accessing files in mass memory 313.

Referring back to the embodiment depicted in FIG. 2, a user on computer system 101 is able to access LAN 131 securely and remotely through a protected communications link through Internet 119. Conversely, users on LAN 131 are able to access computer system 101 securely and remotely through the protected Internet communications link. In one embodiment, the protected communications link through Internet 119 between computer system 101 and gateway system 109 employs the Internet Security Association and Key Management Protocol (ISAKMP)/Oakley protocol to secure communications. As is known to those skilled in the art, ISAKMP/Oakley is the key management protocol designed by the Internet Engineering Task Force (IETF) Internet Protocol Security (IPSec) working group.

As is known to those skilled in the art, ISAKMP/Oakley provides a framework for authentication, security association negotiation and key management for the protected Internet communications link between computer system 101 and gateway system 109. Specifically, ISAKMP provides a framework for authentication and key exchange, but does not define them. Oakley describes a series of key exchanges and details the services provided by each. In one embodiment, the Oakley protocol defines a generic key exchange protocol employing the well-known and complex Diffie-Hellmen key exchange algorithm. As such, the periodic renegotiation of the keys used to secure the protected Internet communications link between computer system 101 and gateway system 109 is a computationally intense operation.

Information describing the ISAKMP/Oakley protocol may be found in the following Internet Draft working documents: Maughan et al., "Internet Security Association and Key Management Protocol (ISAKMP)," ftp.ietf.org/internet-drafts/draft-ietf-ipsec-isakmp-10.txt; Orman, "The OAKLEY Key Determination Protocol," ftp.ietf.org/internet-drafts/draft-ietf-ipsec-oakley-02.txt; and Harkins & Carrel, "The Internet Key Exchange (IKE)," ftp.ieff.org/internet-drafts/draft-ietf-ipsec-isakmp-oakley-08.txt. These documents are incorporated herein by reference.

In the embodiment depicted in FIG. 2, the protected communications link through the Internet 119 includes a first channel 201 and a second channel 203 between ISP 121 and gateway system 109. As a result, two protected links 213 and 215 are formed between computer systems 101 and gateway system 109. In the embodiment illustrated in FIG. 2, protected link 213 is formed between computer system 101 through modem 103, through connection 133 to ISP 121, through channel 203 to gateway system 109. Similarly, protected link 215 is formed between computer system 101 through modem 103, through connection 133 to ISP 121, through channel 203 to gateway system 109.

In one embodiment, protected link 215 and channel 201 carry control traffic used for, among other things, negotiating and renegotiating the policy/key(s) 211 used for securing channels 201 and 203 of the protected Internet communications link. In one embodiment, the ISAKMP/Oakley traffic including policy/key(s) 211 is carried in channel 201. In one embodiment, all traffic in channel 201 is encrypted and therefore protected. In one embodiment, channel 203 is also a protected channel and protected link 213 with channel 203 carry protected data 205 using IPSec between ISP 121 gateway system 109. In one embodiment, channel 203 carries IPSec tunnel traffic.

In accordance with one embodiment of the present invention, when the protected Internet communications link is established between computer system 101 and gateway system 109 of LAN 131, the policy/key(s) 211 used for protecting channels 201 and 203 are negotiated under the ISAKMP/Oakley protocol. In one embodiment, the established secure and authenticated channel through which computer system 101 and gateway system 109 communicate through Internet 119 is called a security association under the ISAKMP/Oakley protocol. After the secured Internet communications link has been established, computer system 101 and LAN 131 are able to communicate securely. Since channels 201 and 203 are secured, it is extremely difficult for an intruder 125 to eavesdrop, interfere with or disrupt communications between computer system 101 and LAN 131.

In one embodiment, the policy/key(s) 211 used under the ISAKMP/Oakley protocol are renegotiated periodically to maintain the security of the protected Internet communications link between computer system 101 and gateway system 109. In one embodiment, the policy/key(s) 211 are renegotiated after a predetermined amount of time has elapsed since the previous time the policy/key(s) 211 have been negotiated. In another embodiment, the policy/key(s) 211 are renegotiated after a predetermined amount of data has been transferred through the protected Internet communications link since the last time the policy/key(s) 211 have been negotiated.

As mentioned earlier, since the process to establish the policy/key(s) 211 is a computationally intense procedure, there is a practical limit on how often the renegotiation process can be performed. As is appreciated to those skilled in the art, the frequency in which the renegotiation process under ISAKMP/Oakley typically occurs is on the order of only every several times per day. Otherwise, computer system 101 and/or gateway system 109 would be unduly burdened with having to recompute the policy/key(s) 211 under the Diffie-Hellmen key exchange algorithm. In the event that a remote computer or box fails to respond to a re-key request under the ISAKMP/Oakley protocol, it is assumed that the remote computer box is no longer reachable and the protected Internet communications link and associated security association under the ISAKMP/Oakley protocol is torn down.

As described above, computer system 101 accesses Internet 119 through a modem connection from modem 103. Consequently, there is a reasonable possibility that the connection 133 between modem 103 and ISP 121 may drop at a frequency higher than that which could be quickly and practically detected by gateway system 109 by simply relying on a timeout exception occurring after a ISAKMP/Oakley re-key or renegotiation request. Indeed, as described above, the renegotiation process is typically performed only several times per day. Unfortunately, the ISAKMP/Oakley protocol was originally designed primarily to secure Internet communications between systems that do not go down regularly. The ISAKMP/Oakley protocol was not originally designed for users logging into networks using unreliable modem connections. Thus, if a connection 133 is unexpectedly dropped for any reason and the user of computer system 101 attempts to re-access LAN 131 through a secured ISAKMP/Oakley connection through Internet 119, there is a possibility that the user may be unable to re-login to LAN 131 because gateway system 109 is unaware that the previous connection 133 between modem 103 and ISP 121 has been dropped.

In particular, under ISAKMP/Oakley, gateway system 109 will not have torn down the security association of the previous protected Internet communications link. Consequently, if the user of computer 101 is entitled to only one secured link to LAN 131 and under ISAKMP/Oakley, the user will be unable to login until the previous secured association is torn down. However, under ISAKMP/Oakley, the security association will not be torn down until the above described timeout exception occurs after the renegotiation request, which in some instances may occur only several times a day.

In another situation, it is appreciated that a router or other hardware device contained in Internet 119 through which communications between computer system 101 and LAN 131 are carried may also fail. In this example, connection 133 between modem 103 and ISP 121 may not have been unexpectedly dropped, but nevertheless, computer system 101 is not reachable from LAN 131 and vice versa. It is appreciated that in this situation, gateway system 109 may also be unaware that computer system 101 is not reachable for many hours until the above described timeout exception occurs after the renegotiation request.

In order to address the above described problem, one embodiment of the present invention transmits a protected keepalive message 209 to the remote computer system or box from the local computer system or box. In one embodiment, the local box may be computer system 101 and the remote box may be gateway system 109. In another embodiment, the local box may be gateway system 109 and the remote box may be computer system 101. Indeed, the present invention is applicable to any combination of local and remote boxes between which there are secured communications through the Internet 119.

In one embodiment, the protected keepalive message is a message to which it is mandatory to send a protected acknowledgement signal. In an embodiment implying the ISAKMP/Oakley protocol, the keepalive message 209 is a protected ISAKMP/Oakley message sent from the local box to the remote box. In one embodiment, the protected ISAKMP/Oakley message is a message to which the remote box must reply with a protected acknowledgement message 207. In one embodiment, the protected keepalive message 209 and the protected acknowledgement message 207 are transmitted through protected link 215 and the first channel 201 between ISP 121 and gateway 109. Since the protected keepalive message 209 and the protected acknowledgement message 207 are secured under the ISAKMP/Oakley protocol, it is appreciated that it is extremely difficult for an intruder 125 to intercept or manipulate protected keepalive message 209 and protected acknowledgement 207 in accordance with teachings of the present invention.

In one embodiment, since the ISAKMP/Oakley protocol was not implemented with a keepalive message, another ISAKMP/Oakley non-keepalive command is used as a keepalive message 209. In one embodiment, an ISAKMP/Oakley quick mode message including an invalid proposal and transform is used as a keepalive message 209 in accordance with the teachings of the present invention. In one embodiment, this quick mode message is transmitted by the local box to the remote box after the communications link has been idle for a period of time. In one embodiment, this keepalive message 209 is transmitted by the local box after, for example, one minute has passed when no traffic has been sent to or received from the remote box. Under the ISAKMP/Oakley protocol, the remote box must reply back to the local box by sending a protected acknowledgement 207 back to the local box.

In the event that the local box does not receive the protected acknowledgement message 207 back from the remote box after having transmitted the protected keepalive message 209, is assumed that the remote box is no longer reachable. As discussed above, this may occur if the modem connection between modem 103 and ISP 121 is dropped or if for example a router or other piece of hardware in Internet 119 providing the protected Internet communications link fails. As a result, the local box can terminate the protected Internet communications link between computer system 101 and gateway system 109 in accordance with the teachings of the present invention. In one embodiment, the local box tears down the associated security association under the ISAKMP/Oakley protocol.

Figure 4:
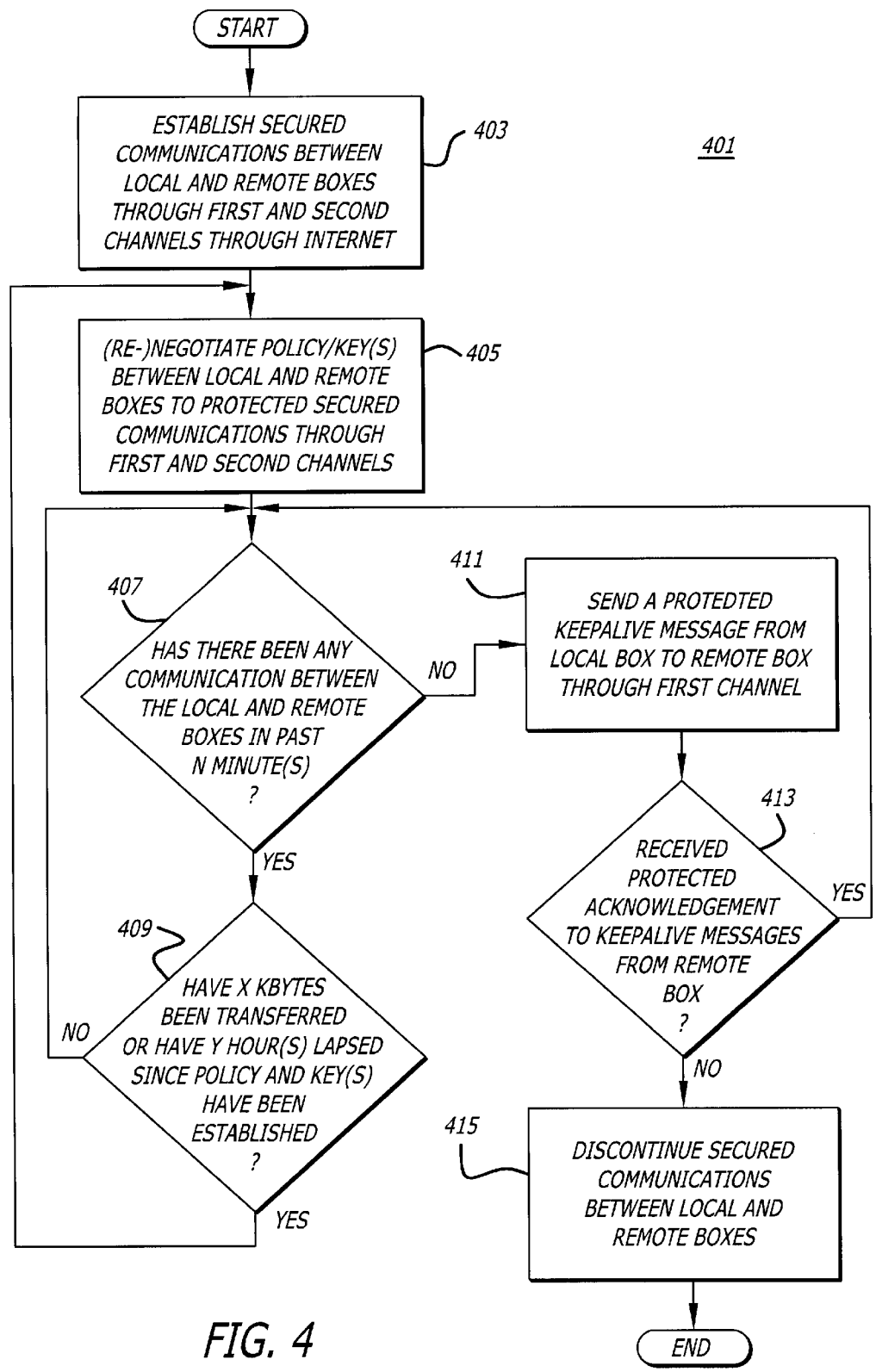
FIG. 4 is a flow diagram illustrating steps performed to verify the reachability of a remote computer from a local computer in accordance with the teachings of one embodiment of the present invention.

FIG. 4 is a flow diagram illustrating steps performed in accordance with the teachings of one embodiment of the present invention. It is appreciated that the steps performed in accordance with the teachings of the present invention may be implemented as software, firmware, hardware, etc., in the local and remote boxes. Processing step 403 shows that secured communications are established between a local box and a remote box through first and second channels through the Internet. Processing step 405 shows that the policy/key(s) between the local box and the remote box are negotiated or renegotiated to protect the secured first and second channels.

Processing decision step 407 shows that it is next determined whether there have been any communications between the local box and the remote box in the past N minutes. Stated differently, it is determined whether the secured communications between the local box and the remote box have been idle in the past N minutes. Is appreciated that N may be chosen to be a value that would on the one hand enable a dropped connection between the remote box and local box to be detected in a relatively short period of time, but on the other hand would not unduly burden the secured communications link between the local and remote boxes with keepalive traffic.

If there has been communications traffic between the local box and remote box in the past N minutes, then processing decision step 409 shows that it is next determined whether X Kbytes have been transferred between the remote box and local box or if Y hours have lapsed since the most recent time that the policy/key(s) have been negotiated. It is appreciated that X or Y are chosen to be values that enable the ISAKMP/Oakley policy/key(s) to be changed at adequate intervals for security reasons while at the same time X or Y are chosen to be values that would not excessively burden the remote and/or local boxes with the computationally intensive processing required to renegotiate the policy/key(s).

If the conditions of processing decision step 409 are met, then processing loops back to processing step 405 where the policy/key(s) are renegotiated to protect the secured communications link. If the conditions of processing decision step 409 are not met, then processing loops back to processing decision step 407 where it is again determined whether there have been any communications between the remote and local boxes within the past N minutes.

In the event that there have not been any communications between the local and remote boxes in the past N minutes, then processing from processing decision step 407 proceeds to processing step 411. Processing step 411 shows that a protected keepalive message is sent from the local box to the remote box through the first channel. As discussed above, the keepalive message is a message to which a protected acknowledgement must be sent. Accordingly, processing decision step 413 shows that it is next determined whether a protected acknowledgement to the keepalive message has been received from the remote box. If so, then processing loops back to processing decision step 407. In this case, it is assumed that the remote box is reachable. However, if the protected acknowledgement is not received, then processing proceeds to processing step 415 where it is shown that the secured communications between the local and remote boxes are discontinued. Indeed, if the protected acknowledgement is not received in processing decision step 413, it is assumed that the remote box is no longer reachable from the local box.

The foregoing discussion has provided numerous examples of the present invention. It will be appreciated that various modifications and changes may be made thereto without departing from a broader spirit and scope of the present invention as set forth in the appended claims.

What is claimed is:

1. A method of verifying reachability of a remote box from a local box, the method comprising:
   establishing a protected Internet communications link between the local box and the remote box;
   transmitting a protected keepalive message to the remote box from the local box after the protected Internet communication link has been idle for a predetermined duration; and
   terminating the protected Internet communications link if the remote box fails to transmit to the local box a protected acknowledgement message in response to the protected keepalive message.

2. The method of claim 1 wherein establishing and the protected Internet communications link between the local box and the remote box includes:
   establishing a protected first channel through the Internet between the local box and the remote box through which control information is transferred; and
   establishing a protected second channel through the Internet between the local box and the remote box through which data information is transferred.

3. The method of claim 2 wherein the protected keepalive message and the protected acknowledgment message are transmitted through the protected first channel between the local and remote boxes.

4. The method of claim 1 wherein it is mandatory that the remote box transmit the protected acknowledgement message to the local box in response to receiving the protected keepalive message.

5. The method of claim 1 wherein establishing the protected Internet communications link between the local box and the remote box, includes negotiating a policy and a key between the local box and the remote box to secure the protected Internet communications link.

6. The method of claim 5 further comprising renegotiating the policy and the key between the local box and the remote box periodically to secure the protected Internet communications link.

7. The method of claim 6 wherein renegotiating the policy and the key between the local box and the remote box periodically to secure the protected Internet communications link, is performed after a predetermined period of time has lapsed.

8. The method of claim 6 wherein renegotiating the policy and the key between the local box and the remote box periodically to secure the protected Internet communications link, is performed after a predetermined amount of information has been transferred between the local box and the remote box.

9. The method of claim 6 wherein transmitting the protected keepalive message to the remote box from the local box, is performed separate from renegotiating the policy and the key between the local box and the remote box periodically to secure the protected Internet communications link.

10. The method of claim 1 wherein establishing the protected Internet communications link between the local box and the remote box, is performed using the Internet Security Association and Key Management Protocol (ISAKMP)/Oakley protocol.

11. The method of claim 10 wherein the protected keepalive message is a protected ISAKMP/Oakley message to which the protected acknowledgement message must be transmitted from the remote box in response.

12. The method of claim 11 wherein the protected ISAKMP/Oakley message is a protected ISAKMP/Oakley quick mode message with an invalid proposal and transform.

13. The method of claim 1 wherein the protected Internet communications link between the local box and the remote box includes an ISAKMP/Oakley security association.

14. The method of claim 13 wherein terminating the protected Internet communications link, includes tearing down the ISAKMP/Oakley security association.

15. A computer readable medium having sequences of instructions stored therein, which when executed cause a processor to perform a method comprising:
   establishing a protected Internet communications link between a local box and a remote box;
   transmitting a protected keepalive message from the local box to the remote box after the protected Internet communication link has been idle for a predetermined duration; and
   terminating the protected Internet communications link if the remote box fails to transmit to the local box a protected acknowledgement message in response to the protected keepalive message.

16. The computer readable medium of claim 15 wherein establishing the protected Internet communications link between the local box and the remote box includes:
   establishing a protected first channel through the Internet between the local box and other remote box through which control information is transferred; and
   establishing a protected second channel through the Internet between the local box and the remote box through which data information is transferred.

17. The computer readable medium of claim 16 wherein the protected keepalive message and the protected acknowledgement message are transmitted through the protected first channel between the local and remote boxes.

18. The computer readable medium of claim 16 wherein it is mandatory that the remote box transmit the protected acknowledgement message to the local box in response to receiving the protected keepalive message.

19. The computer readable medium of claim 15 wherein establishing the protected Internet communications link between the local box and the remote box, includes negotiating a policy and a key between the local box and the remote box to secure the protected Internet communications link.

20. The computer readable medium of claim 19 further comprising renegotiating the policy and the key between the local box and the remote box periodically to secure the protected Internet communications link.

21. The computer readable median of claim 20 wherein renegotiating the policy and the key between the local box and the remote periodically to security protected Internet communications link, is performed after a predetermined period of time has lapsed.

22. The computer readable medium of claim 20 wherein renegotiating the policy and the key between the local box and the remote box periodically to secure the protected Internet communications link, is performed after a predetermined amount of information has been transferred between the local box and the remote box.

23. The computer readable medium of claim 20 wherein transmitting the protected keepalive message to the remote box from the local box is performed separate from renegotiating the policy and the key between the local box and the remote box periodically to secure the protected Internet communications link.

24. The computer readable medium of claim 15 wherein establishing the protected Internet communications link between the local box and the remote box, is performed using the Internet Security Association and Key Management Protocol (ISAKMP)/Oakley protocol.

25. The computer readable medium of claim 24 wherein the protected keepalive message is a protected ISAKMP/Oakley message to which the protected acknowledgement message must be transmitted under the ISAKMP/Oakley protocol from the remote box in response.

26. The computer readable medium of claim 15 wherein the protected Internet communications link between the local box and the remote box includes an ISAKMP/Oakley security association.

27. The computer readable medium of claim 26 wherein terminating the protected Internet communications link includes tearing down the ISAKMP/Oakley security association.

28. A method of maintaining a protected Internet communications link between a local box and a remote box, the method comprising:

renegotiating periodically a policy and a key between the local box and the remote box to secure the protected Internet communications link;

transmitting a protected keepalive message to the remote box from local box after the protected Internet communication link has been idle for a predetermined duration; and terminating the protected Internet communications link if the remote box fills to transmit to local box a protected acknowledgement message in response to the protected keepalive message.

29. The method of claim 28 wherein the protected Internet communications link is established between the local box and the remote box using the Internet Security Association and Key Management Protocol (ISAKMP)/Oakley protocol.

30. The method of claim 29 wherein the protected keepalive message is a protected ISAKM/P/Oakley message to which the protected acknowledgement message must be transmitted from the remote box in response.

31. The method of claim 30 wherein the protected ISAKMP/Oakley message is a protected ISAKMP/Oakley quick mode message including an invalid proposal and transform.

32. The method of claim 29 wherein the protected Internet communications link includes an ISAKMP/Oakley security association.

33. The method of claim 32 wherein terminating the protected Internet communications link includes tearing down the ISAKMP/Oakley security association.

34. The method of claim 28 wherein renegotiating periodically the policy and the key between the local box and the remote box to secure the protected Internet communications link, is performed after predetermined period of time has lapsed.

35. The method of claim 28 wherein renegotiating periodically the policy and the key between the local box and the remote box to secure the protected Internet communications link, is performed after predetermined amount of information has been transferred between the local box and a remote box.

36. The method of claim 28 wherein transmitting the protected keepalive message to the remote box from the local box is performed after the protected Internet communications link has been idle.

* * * * *